(12) United States Patent
Forssell et al.

(10) Patent No.: US 9,377,033 B2
(45) Date of Patent: Jun. 28, 2016

(54) GEROTOR PUMP, A GEROTOR MOTOR AND A GEROTOR TRANSMISSION SYSTEM

(75) Inventors: Jonas Forssell, Torslanda (SE); Christer Odenmarck, Torslanda (SE); Lars Andersson, Göteborg (SE); Jan Andersson, Kullavik (SE)

(73) Assignee: Volvo Car Corporation, Gothenburg (SE)

( * ) Notice: Subject to any disclaimer, the term of this patent is extended or adjusted under 35 U.S.C. 154(b) by 163 days.

(21) Appl. No.: 14/001,667

(22) PCT Filed: Mar. 8, 2012

(86) PCT No.: PCT/EP2012/054036
§ 371 (c)(1),
(2), (4) Date: Dec. 3, 2013

(87) PCT Pub. No.: WO2012/120094
PCT Pub. Date: Sep. 13, 2012

(65) Prior Publication Data
US 2014/0083086 A1    Mar. 27, 2014

(30) Foreign Application Priority Data
Mar. 9, 2011    (EP) .................................... 11157519

(51) Int. Cl.
*F03C 2/00* (2006.01)
*F03C 4/00* (2006.01)
(Continued)

(52) U.S. Cl.
CPC . *F15B 7/008* (2013.01); *F01C 1/10* (2013.01); *F01C 1/103* (2013.01); *F01C 20/14* (2013.01);
(Continued)

(58) Field of Classification Search
CPC .......... F04C 2/102; F04C 2/103; F04C 2/104; F04C 14/14; F15B 7/008; F16K 5/08; F16H 39/36; F01C 1/10; F01C 1/103; F01C 20/14

USPC .......... 418/61.3, 104, 131–132, 270; 251/304
See application file for complete search history.

(56) References Cited

U.S. PATENT DOCUMENTS 3,895,888 A * 7/1975 Roberts ..................... 418/61.3
5,989,001 A * 11/1999 Eisenmann ................. 418/61.3
2002/0076345 A1 6/2002 Hansen

FOREIGN PATENT DOCUMENTS

DE        879 942 A    6/1953
GB        768 933 A    2/1957
(Continued)

OTHER PUBLICATIONS

International Search Report for International Application No. PCT/EP2012/054036 dated Aug. 1, 2013.

*Primary Examiner* — Theresa Trieu
(74) *Attorney, Agent, or Firm* — Renner, Otto, Boisselle & Sklar, LLP

(57) ABSTRACT

A gerotor pump including a housing which includes a first supply socket and a second supply socket, an inner rotor, and an outer rotor rotatably located relative the housing. The inner rotor is located within the outer rotor, lobes of the inner and the outer rotors are engaged, and the inner rotor is centered around a rotational axis which is eccentric from an axis of rotation of the outer rotor. A pressure chamber with a high pressure and a low pressure section is defined between the inner and outer rotors. The inner rotor is rotatably arranged on a shaft cylinder which is fixed at one end of a central drive shaft of the pump and is centered about the rotational axis, whereby the inner rotor wanders in the outer rotor when the central drive shaft is turned. The inner rotor is provided with radial supply conduits extending from the pressure chambers to the shaft cylinder. The shaft cylinder is provided with at least a first and a second cylinder opening, such that the first cylinder opening is axially displaced relative the second cylinder opening, and the first opening is arranged such that it is connected to the high pressure section, and the second cylinder opening is arranged such that it is connected to the low pressure section.

3 Claims, 10 Drawing Sheets

(51) Int. Cl.
*F04C 2/00* (2006.01)
*F15B 7/00* (2006.01)
*F04C 2/10* (2006.01)
*F04C 14/14* (2006.01)
*F01C 1/10* (2006.01)
*F01C 20/14* (2006.01)
*F16K 5/08* (2006.01)
*F16H 39/36* (2006.01)

(52) U.S. Cl.
CPC ................ *F04C 2/102* (2013.01); *F04C 2/103* (2013.01); *F04C 14/14* (2013.01); *F16K 5/08* (2013.01); *F16H 39/36* (2013.01)

(56) References Cited

FOREIGN PATENT DOCUMENTS

| GB | 793 089 A | 4/1958 |
| GB | 2 383 609 A | 7/2003 |

* cited by examiner

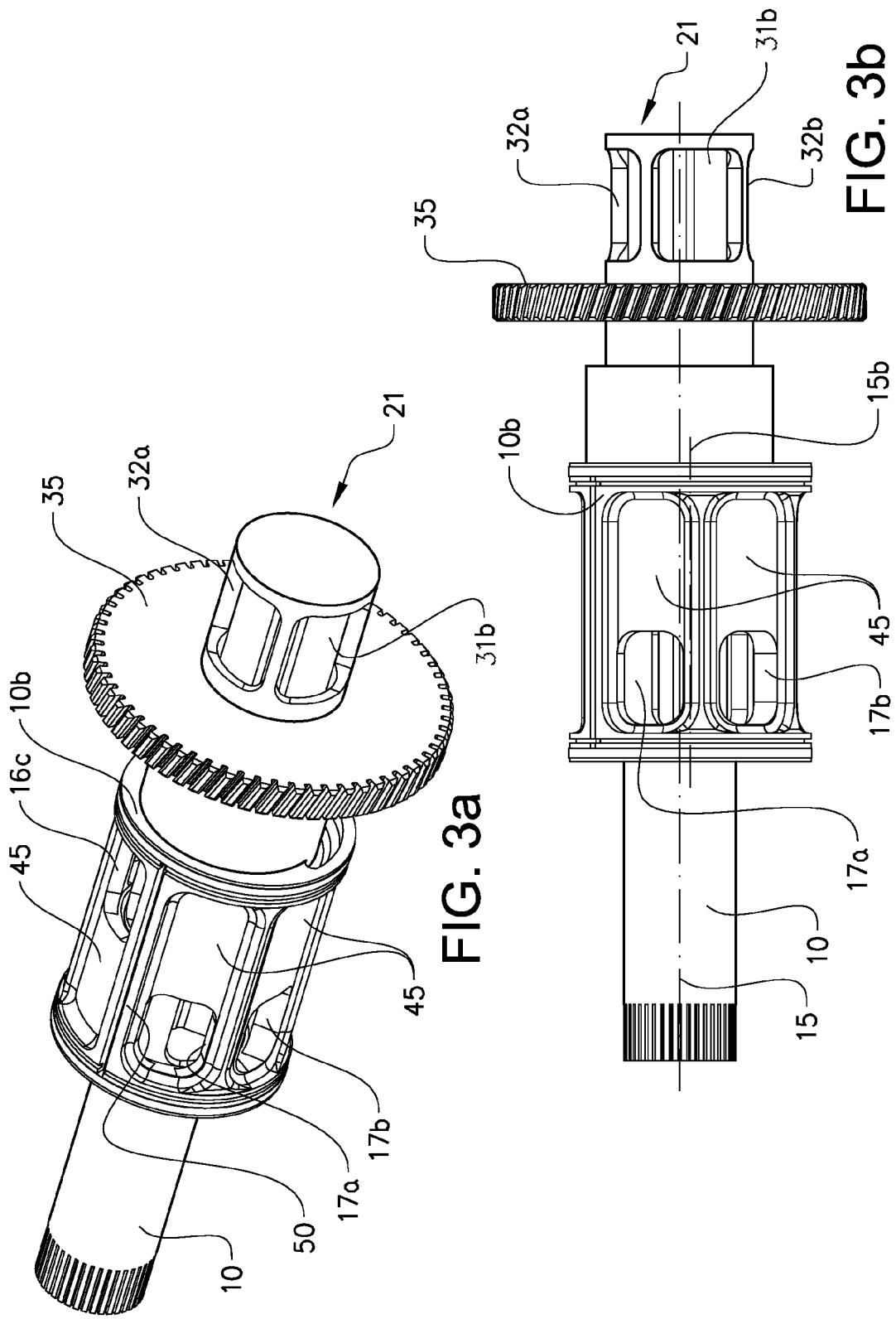

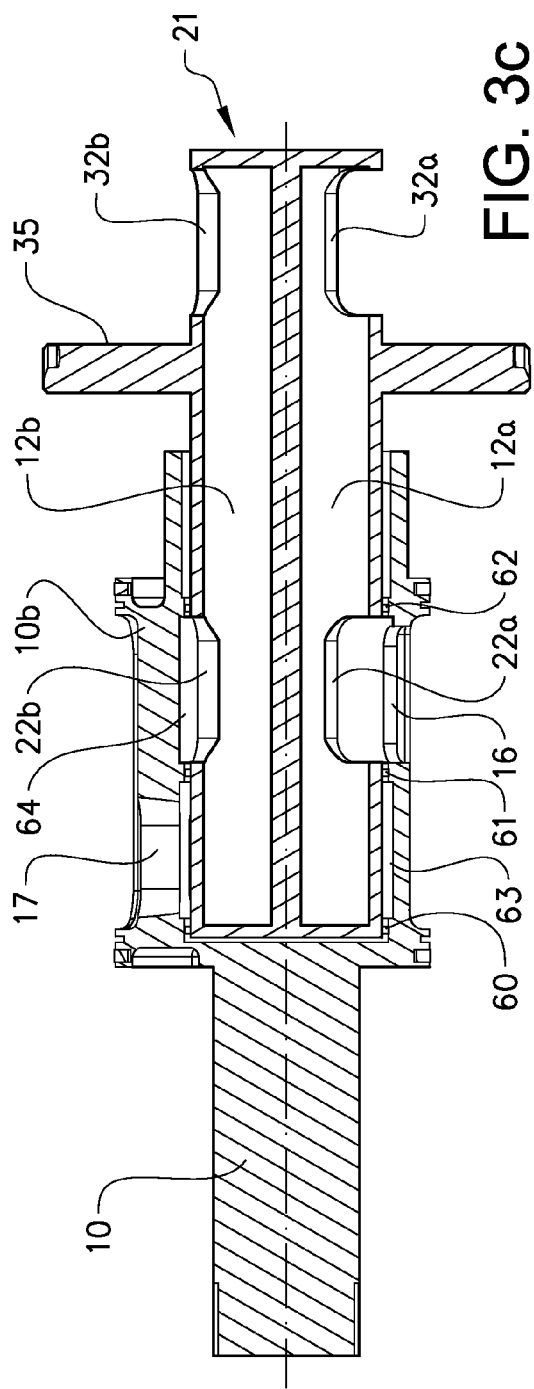
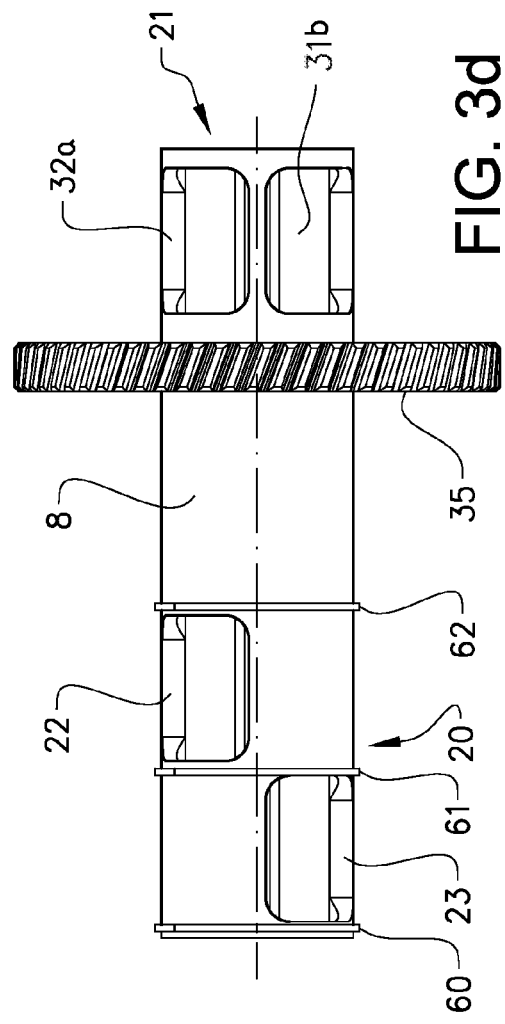

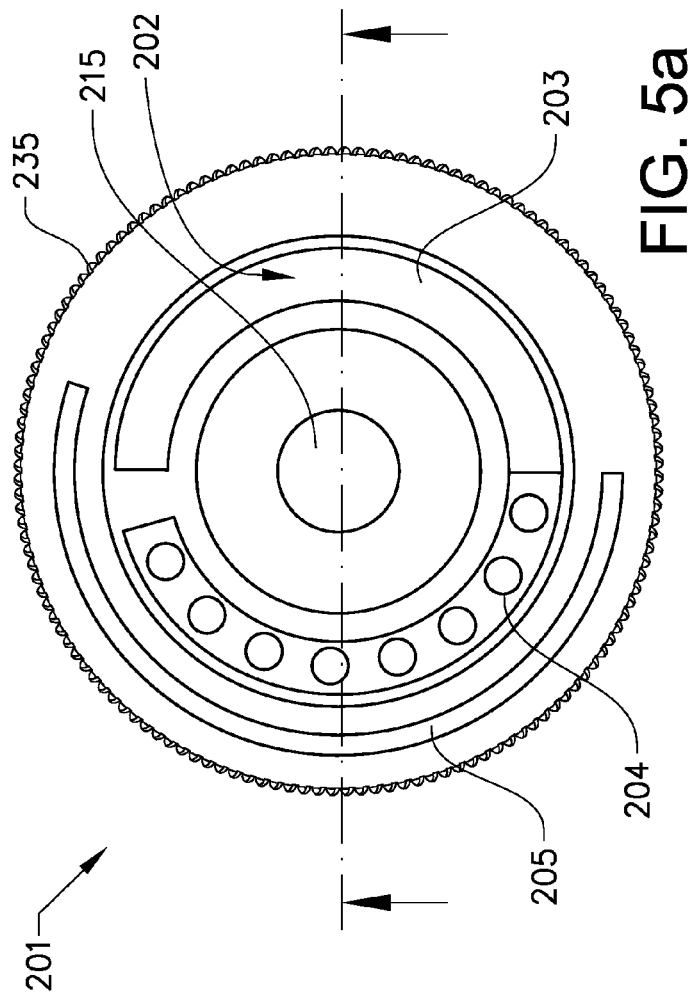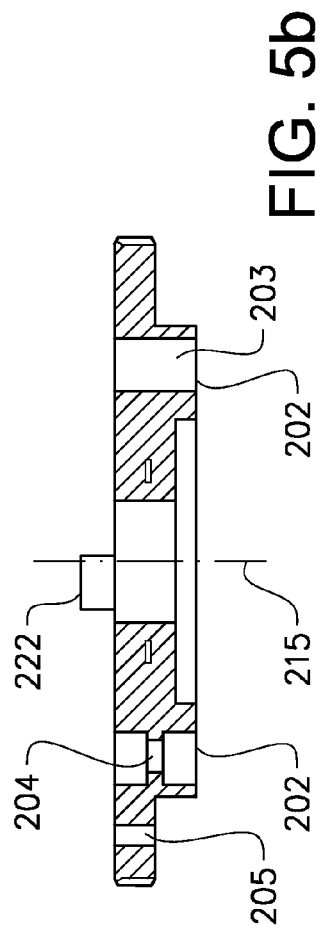

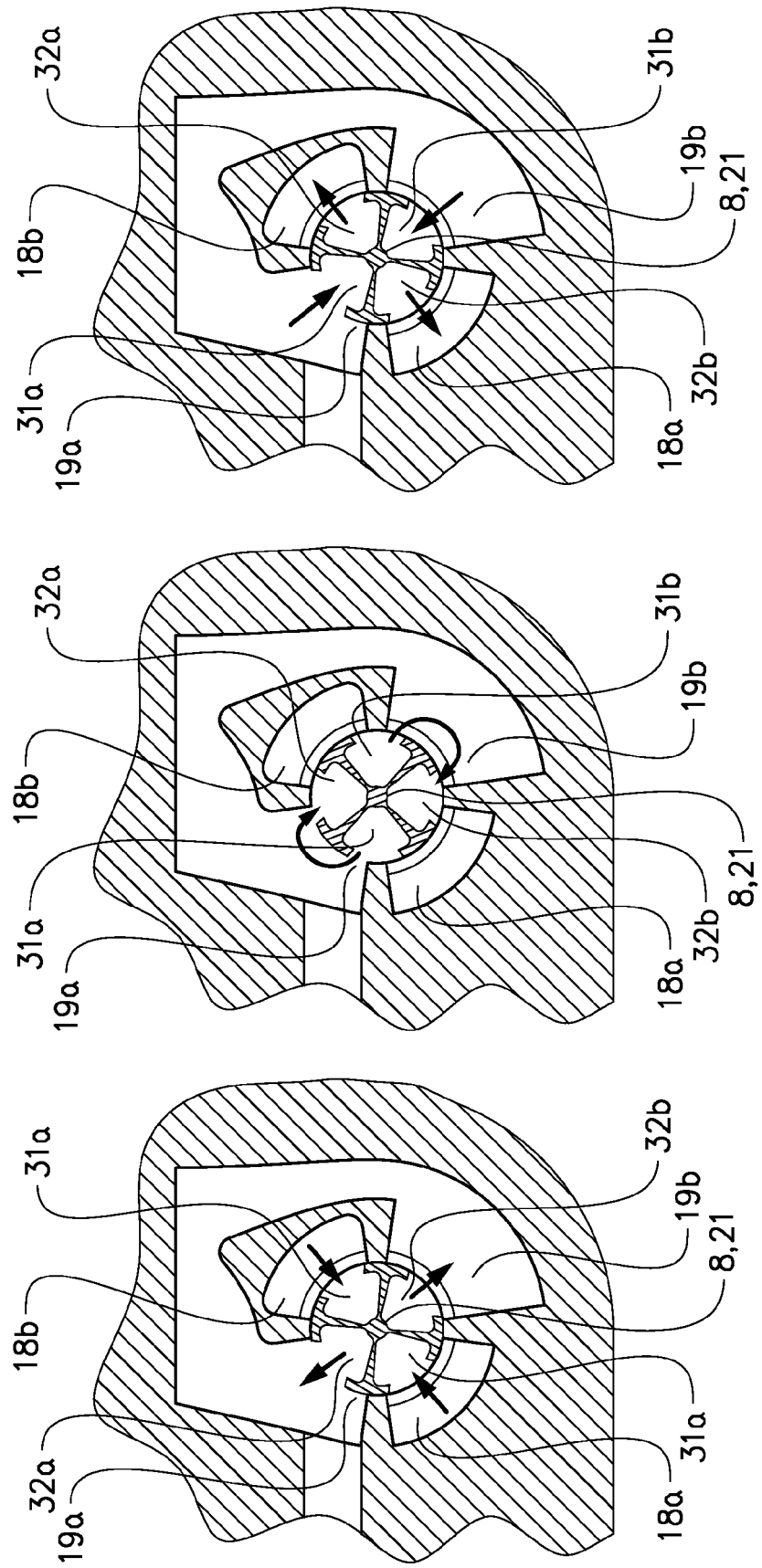

GEROTOR PUMP, A GEROTOR MOTOR AND A GEROTOR TRANSMISSION SYSTEM

TECHNICAL FIELD

The present invention relates the field of gerotors and especially their application in transmission systems

BACKGROUND ART

Today, there exist various examples of gerotors used as hydraulic pumps and motors. These gerotors comprises pressure chambers defined by interacting lobes of an inner rotor and an outer rotor. Gerotors are well known fluid directing units and typically comprise a hollow outer rotor provided with internal lobes and an inner rotor provided with external lobes.

Today, there exist two types of gerotors, which are Low Speed High Torque (LSHT) gerotors and High Speed Low Torque (HSLT) gerotors.

For the LSHT gerotors, the outer rotor is stationary and the inner rotor is located within the outer ring. The inner rotor has one less lobe than the outer rotor and has an axis of rotation which is offset or eccentric relative to an axis of the outer ring. The inner rotor is eccentrically disposed within the outer rotor. The inner rotor is mounted for rotational and orbital movement relative the outer rotor and is supported and guided by the lobes of the outer rotor. The interacting external and internal lobes of the inner rotor and the outer rotor define a plurality of volume pressure chambers which expand and contract during the movement of the inner rotor. These known LSHT gerotors are restricted to a slow rotation speed of the drive shaft, since the shaft only rotates one cog per orbit of the inner rotor. These known LSHT gerotors comprises separate valve constructions for directing fluids. A further weakness of these types of gerotors is that they comprise oscillating parts resulting in vibrations and noise. These solutions are restricted to comprising several parts which provide a heavy and bulky solution. Further, these known solutions are restricted to solutions with a high cost comprising of several expensive and complex parts.

For the HSLT gerotors, the outer rotor rotates simultaneously with the inner rotor. The inner rotor rotates around a fixed axis and the outer ring slides within a housing. These known HSLT gerotors needs a wide gap between the housing and the lobes of the inner rotor and the outer ring. Thus, these known solutions result in a high leakage and low efficiency. These existing solutions provide constant efficiency losses and fluid leakage at high pressure.

The above mentioned problems can enhance each other as a combination of gerotors is used in a hydraulic transmission.

There is thus a need for an improved gerotor pump and motor, which reduces or preferably removing the above mentioned disadvantages.

SUMMARY

The object of the present invention is to provide an inventive gerotor pump, and gerotor motor and combine these in a inventive gerotor transmission system.

Said gerotor pump comprises a housing which comprises a first and a second supply socket, an inner rotor and an outer rotor, which both are rotatably located relative the housing. The inner rotor is located within the outer rotor, and lobes of the inner and the outer rotor engaging. The lobes can be of any know design for gerotor applications. The inner rotor is centred on a rotational axis which is eccentric from an axis of rotation of said outer rotor. Said axis of rotation of the outer rotor is also the centre axis of the pump. A pressure chamber with a high pressure and a low pressure section, is defined between the inner and outer rotor.

The inventive gerotor pump is characterised in, that the inner rotor is rotatably arranged on a shaft cylinder which is fixed at one end of a central drive shaft of the pump and is centred about said rotational axis of the inner rotor. Whereby said inner rotor wanders in said outer rotor when said central drive shaft is turned. The wandering is caused by the eccentric arranged shaft cylinder as it rotates. I.e. when the central drive shaft is rotated the shaft cylinder will rotate with it, the shaft cylinder thereby slide in the inner rotor, which rotational axis will perform an orbital movement about the axis of rotation of the outer rotor.

The high pressure section of the pressure chamber is thereby located in front of the maximum offset of the shaft cylinder surface relative said central axis of the pump, when the gerotor is used as a pump. Hence, the low pressure chamber is thereby located behind the minimum offset of the shaft cylinder surface relative said central axis of the pump, when the gerotor is used as a pump. Wherein in front of is in the direction of rotation of the central axis, and behind is in the opposite direction of the direction of rotation of the central drive shaft.

The inner rotor is provided with radial supply conduits extending from the pressure chambers to the shaft cylinder. A pressure medium used in said pump is thereby sucked into the pressure chamber through said radial supply conduits in said low pressure section, and pressed out through the radial supply conduits in said high pressure section.

To provide an inlet and outlet for the pumped pressure medium, the shaft cylinder is provided with at least a first and a second cylinder opening. The first cylinder opening is axially displaced relative the second cylinder opening. This facilitates a control of the inventive gerotor pump.

Said first cylinder opening is arranged such that it is connected to said high pressure section, hence the first cylinder opening is located on the shaft cylinder such that it at earliest begins at the maximum offset of the surface of the shaft cylinder relative the central axis of the pump and extends no longer than to the minimum offset of the surface of the shaft cylinder, relative the central axis of the pump.

Said second cylinder opening is arranged such that it is connected to said low pressure section. Hence, the second cylinder opening is located on the shaft cylinder such that it at earliest begins at the minimum offset of the surface of the shaft cylinder, relative the central axis of the pump, and extends no longer than to the maximum offset of the surface of the shaft cylinder relative the central axis of the pump. One of the first and the second supply socket are connected to one of the first and the second cylinder opening correspondently.

The inventive pump is a displacement pump in which both the drive shaft and the outer rotor can be turn, whereby the flow rate of the pump is dependent of the relative speed between the drive shaft and the outer rotor. The inventive pump is compact in its design, due to its radial feeding through the radial supply conduits and the cylinder openings. The inventive gerotor pump can also be made very efficient, because all rotating parts can be arranged on the central shaft, whereby low tolerances can be achieved, with minimal effort. A high efficiency can be reached, because the relative speed between the inner rotor and the flanges mounted on the outer rotor is low, this since the inner rotor just rotates a distance corresponding to one lobe engagement when the central shaft rotates a 360 degrees. Further, because the flanges rotates with the outer rotor, and both the outer and inner rotor rotates in the same direction, the relative speed between the flanges and the inner rotor is reduced, thereby can the gerotor pump be sealed more efficiently, which further contributes to a high efficiency of the gerortor pump. The inventive gerotor pump can also be used as a gerotor motor.

An advantageous embodiment of the invention has an inner end of a supply tube provided inside the shaft cylinder. Said supply tube is provided with a first and a second supply line, which at their outer ends are connected to said first and second supply socket correspondently. Further, the supply tube is provided with at least a first and a second supply opening corresponding to said first and second supply line, and wherein the first and second supply opening are axial displaced relative each other, such that the axial position of said first and second supply opening corresponds to the axial position of said first and second cylinder opening. The pressure chamber is thereby connected with the first and second supply socket through the supply lines, wherein a pressure medium can be pumped from one of the supply sockets to the other. The supply tube does not rotate with the shaft cylinder, but can be turned. The supply tube thereby facilitates a forward—backward and neutral control of the gerotor pump. This, because the connection between the supply sockets easily can be made such, that by turning the supply tube the supply sockets can be connected to a different supply line, or the supply lines are connected with each other, such that a pressure difference between the two pressure chambers cannot be build up. This is explained further in conjunction with the FIGS. 7a-7b.

Further advantages are achieved by implementing one or several of the features of the dependent claims.

According to another aspect of the invention a gerotor motor is suggested. The gerotor motor comprising an inner rotor, and an outer rotor rotatably located relative a housing, wherein said housing is provided with a first and a second supply socket.

The inner rotor is located within the outer rotor and lobes of the inner rotor and the outer rotor engaging. The inner rotor is centred about a rotational axis which is eccentric from an axis of a relative the housing fix central shaft of the gerotor motor. The inner rotor is eccentric rotatably arranged on said central shaft.

The gerotor motor is characterised in, that a first and a second flange extends radial from both sides of the outer rotor, such that said flanges defines a pressure chamber with a first and a second pressure section between the inner and outer rotor. The first and second pressure sections will be stationary relative the housing, this because the central shaft is fix and the inner rotor is rotatably arranged thereon.

At least said first flange is provided with essentially axial supply conduits, i.e. the supply conduits extends through the flange from one axial side to the other of the flange. The axial supply conduits are provided between said pressure chamber and a circular arc shaped supply chamber provided in the housing. The circular shape of the supply chamber facilitates an interface to the pressure chamber, which has an essentially circular outer circumference.

Said circular arc shaped supply chamber is divided into a first and a second supply chamber each connected to one of said supply sockets, and separated by a first head, which protruding into said circular arc shaped supply chamber. The first head is adapted to fit into the circular arc shaped supply chamber, such that it seals the first and second supply chamber from each other.

Due to the flanges rotates with the outer rotor, and both the outer and inner rotor rotates in the same direction, the relative speed between the flanges and the inner rotor is reduced, thereby can the gerotor motor be sealed more efficiently, wherein a high efficiency of the gerortor motor can be achieved.

Further, because both the inner and the outer rotor can be rotatably arranged on the central shaft (the outer rotor over the flanges), the gerotor motor can be efficiently sealed and becomes a higher efficiency. Gaps between the inner and outer lobes can be minimized, due to the arrangement on the central shaft, wherein there will be less leakage between different pressure sections in the pressure chamber.

Due to the relative to the central shaft and housing fix pressure sections in the pressure chamber and the axial supply conduits a simple and effective control of the pump can be implemented. An example of such a control is further described below.

According to a further object of the invention a hydraulic transmission is suggested. The inventive hydraulic transmission comprises the above described gerotor pump and gerotor motor, wherein the supply sockets of the both are connected such that the gerotor pump can drive the gerotor motor, whereby a closed oil circulation system is formed.

Further, the outer rotors of the gerotor pump and the gerotor motor are provided with gearings, and said gearings meshes with each other, directly or indirectly over additional gearing, are meshed with each other.

The inventive transmission is a split torque transmission, in which the torque can be transmitted over both the gearings and over the oil circulation system.

The input of the transmission is the central drive shaft of the gerotor pump and the output is the gearings of the outer rotors. Wherein, the transmission can be driven backwards, i.e. in the case of engine braking, whereby the gerotor pump becomes the function of a motor and the gerotor motor becomes the function of a pump.

By using a gerotor pump and/or gerortor motor according to any of the depending claims in the inventive transmission, the transmission becomes additional features and advantages, which are described further below.

The general working principle of a hydraulic transmission of this art with a displacement pump and a displacement motor is known and will therefore not be explained in further detail. However, by using the gerotor pump and gerotor motor according to the invention a high efficient, compact and easy to control gerotor transmission system can be constructed. Further, due to its simple control and design, the inventive hydraulic transmission system will also be inexpensive to produce.

BRIEF DESCRIPTION OF THE DRAWINGS

The present invention will now be described in detail with reference to the figures, wherein:

FIGS. 3a-d shows schematically drawings of a central drive shaft, the shaft cylinder and the supply tube of the gerotor pump.

FIG. 5 a-b shows schematically drawings of a control disc according to the invention.

FIGS. 7a-c shows a schematically drawing of the three positions of the supply tube.

DETAILED DESCRIPTION

Figure 1:
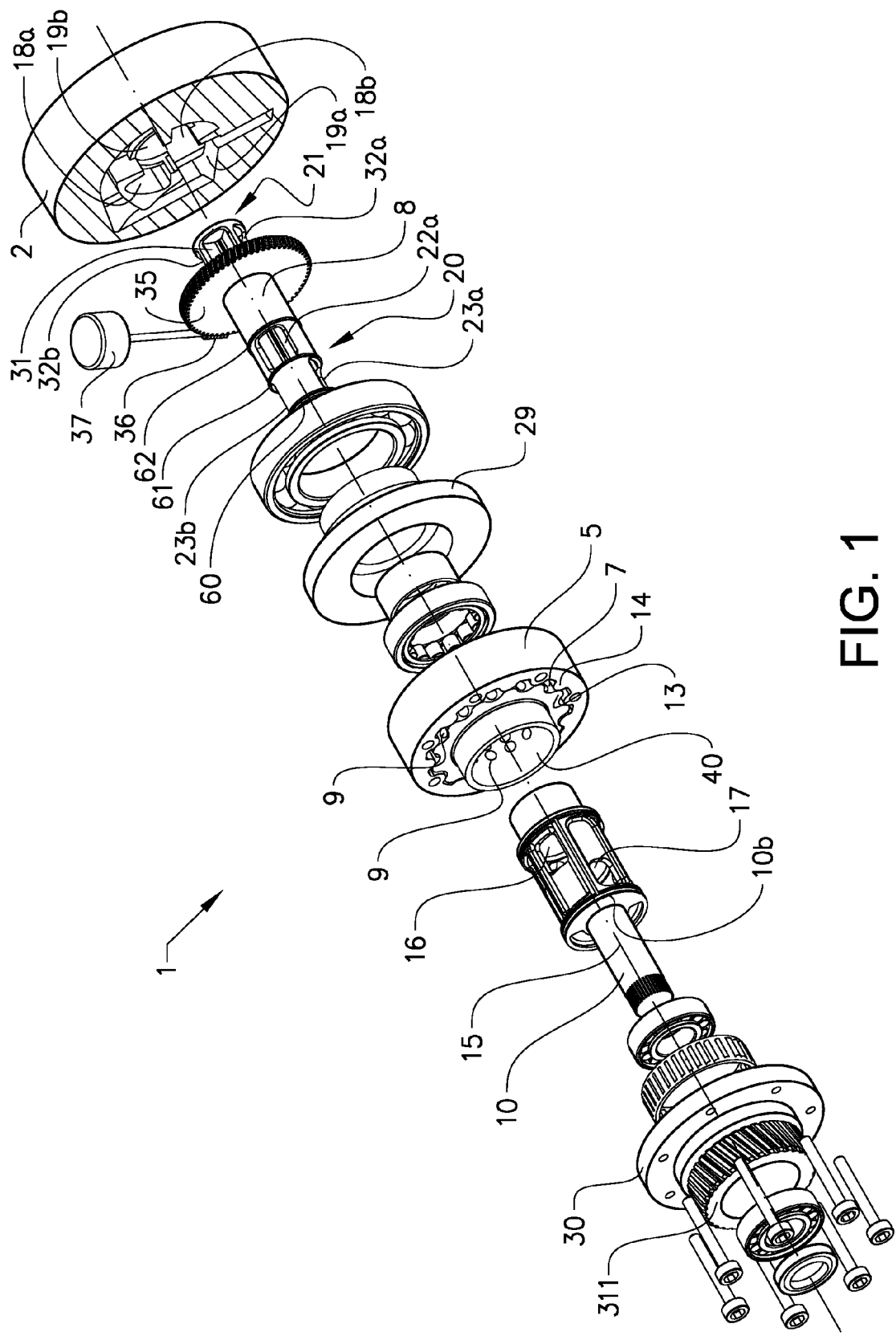
FIG. 1 shows a schematically exploded view drawing of a gerotor pump according to the invention.

In the following several embodiments of the invention is shown and described, simply by way of illustration of specifics modes of carrying out the invention.

The invention is not limited to the specific embodiments presented, but includes all variations within the scope of the present claims. Standard structural members such as bearings, bolts and bore holes are in general not further commented or described and are also not provided with any reference signs in the drawings.

FIG. 1 shows an embodiment of a gerotor pump 1 according to the invention. The pump 1 is referred to as a pump, but can also function as a motor. The pump 1 comprises a housing 2, which comprises a first and a second supply socket 18a, 18b; 19a, 19b. The housing 2 is just partially shown in the drawing. An inner rotor 4 and an outer rotor 5 are rotatably arranged about a central axis 15. The inner rotor 4 is located within the outer rotor 5, and lobes 13, 14 of the inner and the outer rotor 4, 5 engaging. The inner rotor 4 is centred about an rotational axis 15b (shown in FIG. 3c) which is eccentric from the central axis 15, which also is the axis of rotation 15 of said outer rotor 5. A pressure chamber 7 with a high pressure and a low pressure section 7a, 7b is defined between the inner and outer rotor 4, 5.

A torque input to the pump 1 is applied at a central drive shaft 10 of the pump, which central drive shaft 10 is centred on the central axis 15. The inner rotor 4 is rotatably arranged on a shaft cylinder 10b which is fixed at one end of the central drive shaft 10, wherein the inner rotor 4 is centred about said rotational axis 15b. Hence, the shaft cylinder 10b is eccentric arranged on the central drive shaft.

Due to the eccentricity of the shaft cylinder 10b and the rotatable arrangement of the inner rotor 4 on the shaft cylinder 10b, the lobes 13 of the inner rotor 4 will engage with the lobes 14 of the outer rotor 5 when the central drive shaft 10 is turned, and the inner rotor 4 wanders thereby along the inner periphery of the outer rotor 5. In the shown embodiment, the inner rotor 4 slides on the shaft cylinder 10b, as the shaft cylinder 10b is rotating, whereby the inner rotor 4 wanders inside the outer rotor 3, i.e. the inner rotor 4 wanders thereby in the outer rotor 5. The inner rotor 4 rotates the distance of one lobe 13, 14 engagement for each full revolution of the shaft cylinder 10b.

The inner rotor 4 is provided with radial supply conduits 9 extending from the pressure chambers 7 to the shaft cylinder 10b. When the radial supply conduits 9 are in a low pressure section 7a of the pressure chamber 7, pressure medium will be sucked into the pressure chamber 7 through the radial supply conduits 9, and when the radial supply conduits 9 are in a high pressure section 7b of the pressure chamber 7, pressure medium will be pressed out of the pressure chamber 7 through the radial supply conduits 9.

The shaft cylinder 10b is provided with at least a first and a second cylinder opening 16, 17, wherein in the embodiment shown the shaft cylinder 10b is provided with six openings 16a, 16b, 16c and 17a, 17b, 17c, grouped in two groups 16, 17 of three, this to increase the strength of the shaft cylinder 10b and still have an opening over essentially the whole circumference of the shaft cylinder 10b. The first cylinder openings 16a, 16b, 16c are axially displaced relative the second cylinder openings 17a, 17b, 17c, and said first cylinder openings 16a, 16b, 16c are arranged such that they are connected to said high pressure section 7b, and said second cylinder openings 17a, 17b, 17c are arranged such that it is connected to said low pressure section 7a.

In the shown preferred embodiment of the gerotor pump, an inner end 20 of a supply tube 8 is provided inside the shaft cylinder 10b, whereby an effective supply of pressure medium to the gerotor pump is accomplished. The supply tube 8 is provided with a first and a second supply line, 11, 12 each preferably divided into two sublines 11a, 11b, 12a, 12b, evenly spread within the interior of the supply tube 8 and extending axially. The supply lines 11a, 11b; 12a, 12b can be connected to said first and second supply socket 18a, 18b; 19a, 19b, at an outer end 21 of the supply tube 8.

To connect the pairs of supply lines 11a, 11b; 12a, 12b, with the pressure chamber 7, the supply tube 8 is provided with at least a first and a second supply opening 22a, 22b, 23a, 23b corresponding to said first and second supply lines 11a, 11b; 12a, 12b. The pairs of supply openings 22a, 22b; 23a, 23b are correspondently spread around the circumference area of the supply tube 8 such that each pair is located opposite each other. It is however important that the first and second supply opening 22a, 22b, 23a, 23b are axial displaced relative each other such that the axial position of said pairs 22, 23 of said first and second supply opening 22a, 22b, 23a, 23b corresponds to the axial position of said groups 16, 17 of said first and second cylinder opening 16a, 16b, 16c; 17a, 17b, 17c. This allows the first supply opening 22a, 22b to have contact only with the first cylinder opening 16a, 16b, 16c and the second supply opening 23a, 23b to have contact only with the second cylinder opening 17a, 17b, 17c. A pressure medium can thereby be pumped from the first supply socket 18a, 18b, through the first supply line 11a, 11b and through the first supply opening 22a, 22b and the first cylinder opening 16a, 16b, 16c and into the low pressure section 7a of the pressure chamber 7 through the radial supply conduits 9.

When the pressure medium is displaced between the rotors 4, 5 to the high pressure section 7b of the pressure chamber 7, it will be pressed out through the radial supply conduits 9 and into the second supply line 12a, 12b through the second cylinder opening 17a, 17b, 17c and the second supply opening 23a, 23b and out to the second supply socket 19a, 19b. The axial displacements of cylinder opening 16, 17 and the supply opening 22, 23 allow that the high and low pressure sections 7a, 7b are connected with one supply line respectively.

In order to reach moment equilibrium about the rotational axis 15b, the inner area 40 of the inner rotor 4 extends further in the axial direction than the pressure chamber 7. The area of the projection of the outer area (in the pressure chamber 7) of the inner rotor 4 and the projection of the inner area 40 that is exposed to the cylinder openings 16a, 16b, 16c, 17a, 17b, 17c are preferably equal, whereby a moment equilibrium in respect of the pressure forces is achieved.

Further, the outer rotor 5 is preferably provided with a first and a second flange 29, 30 at each axial side. The flanges 29, 30 thereby delimit the pressure chamber 7 in its axial direction. This improves the efficiency of the pump 1, since the pressure chamber 7 is thereby better sealed, because the low relative speed between the flanges 29, 30 and the inner rotor 4.

Figure 2:
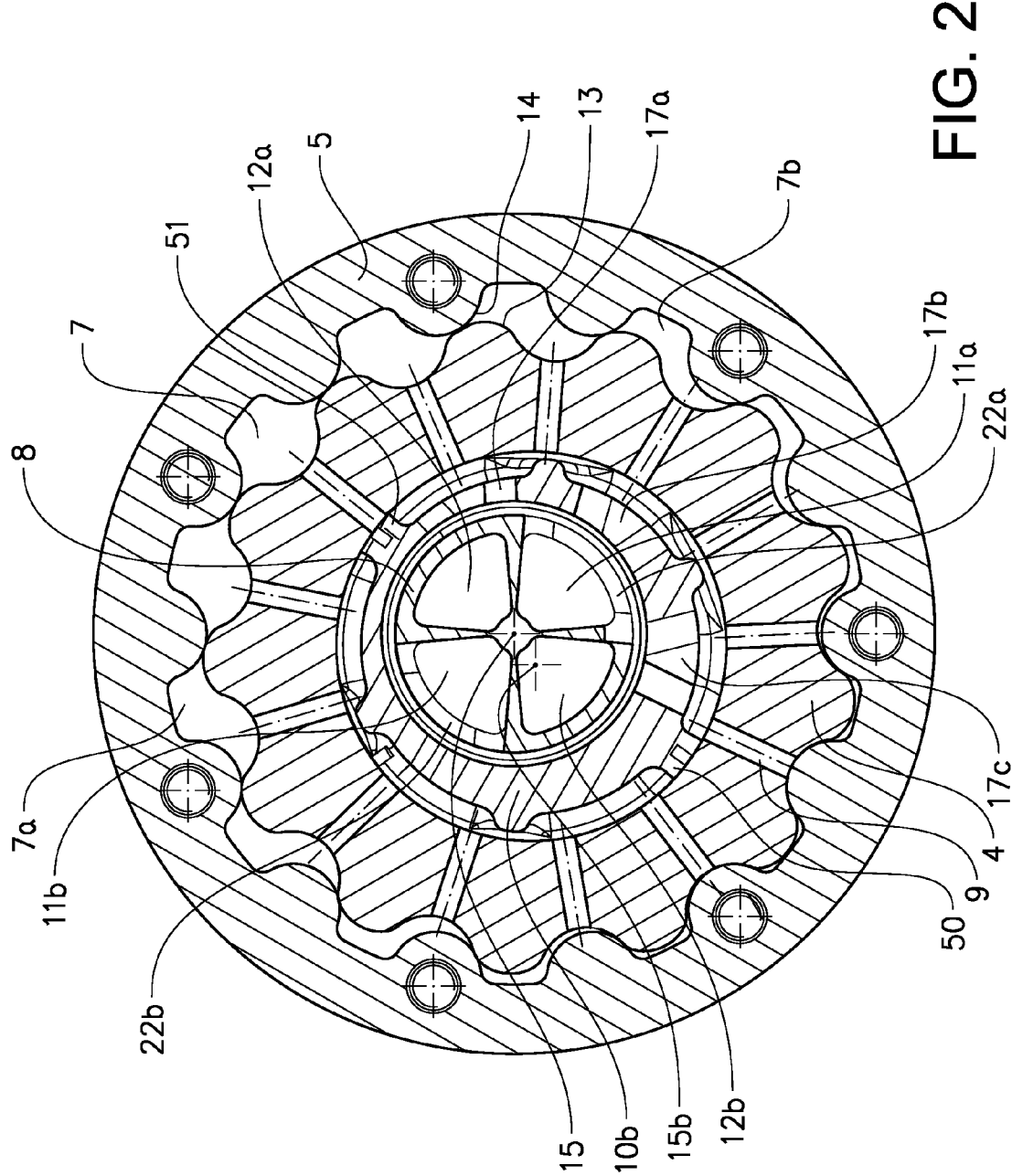
FIG. 2 shows a schematically crosscut drawing through the gerotor pump.

FIG. 2 discloses a crosscut through the pump 1, i.e. the inner and outer rotor 4, 5. In the middle, centred about the central axis 15 the supply tube 8 is located. In this preferred embodiment the supply tube 8 is provided with four supply lines 11a, 11b; 12a, 12b, i.e. the first and second supply line 11a, 11b, 12a, 12b is divided in two pairs of supply lines 11a, 11b, 12a, 12b each pair located opposite each other in the supply tube 8, and wherein each sub supply line 11a, 11b; 12a, 12b is provided with a corresponding supply opening 22a, 22b, 23a, 23b, wherein just the first supply openings 22a, 22b is shown in FIG. 2. This, since the first and second pair of supply openings 22a, 22b, 23a, 23b are axially displaced relative each other.

Outside of the supply tube 8 the rotatable shaft cylinder 10b is located, which rotates with the central drive shaft 10 of the pump. The high and low pressure section 7a, 7b follows the rotation of the shaft cylinder 10b. When the shaft cylinder 10b rotates in clockwise, the high pressure section 7a extends in the pressure chamber 7 from the same radial position as the vane 50 is located and in clockwise direction, to the same radial position as the vane 51. If the shaft cylinder 10b would be rotated contraclockwise the high pressure section 7a and the low pressure section 7b would change place. The shaft cylinder 10b, slides on the vanes 50, 51 and the outer axial edges, which seals between the supply tube 8 and the inner rotor 4. The outer axial edges are preferably provided with sealing rings. The vanes 50, 51 are located where the offset of the surface of the shaft cylinder 10b is at its maximum and minimum respectively.

It is preferred that the cylinder openings 16a, 16b, 16c, 17a, 17b, 17c are positioned such the first cylinder openings 16a, 16b, 16c (not shown in FIG. 2, since all the first cylinder openings 16a, 16b, 16c are place in another axial position than the crosscut) are arranged on the half of the periphery area of the shaft cylinder 10b, which extends, in clockwise direction, from the vane 50 to the vane 51. The first cylinder opening 16a, 16b, 16c are thereby connected to the high pressure section 7a of the pressure chamber 7, through the radial supply conduits 9, wherein the second cylinder openings 17a, 17b, 17c are arranged on the half of the periphery area of the shaft cylinder 10b, which extends, in clockwise direction, from the vane 51 to the vane 50. The second cylinder openings 17a, 17b, 17c are thereby connected to the low pressure section 7b of the pressure chamber 7, through the radial supply conduits 9.

Now, the relation between the supply tube 8 and the shaft cylinder 10b and the cylinder openings 16a, 16b, 16c, 17a, 17b, 17c and supply openings 22a, 22b, 23a, 22b in a preferred embodiment of the invention will be further explained in conjunction with FIGS. 3a, 3b, 3c, 3d.

FIGS. 3a, 3b and 3c shows the supply tube 8 arranged in the shaft cylinder 10b, and FIG. 3d shows just the supply tube 8. The outer end 21 of the supply tube 8 is provided with a first and a second feeding opening 31a, 31b, 32a, 32b, each group 31, 32 of openings corresponds to the first and the second supply line 11a, 11b, 12a, 12b. The feeding openings 31a, 31b, 32a, 32b are adapted to be connected to the supply sockets 18a, 18b, 19a, 19b in the housing 2 (not shown in FIG. 3). As the shaft cylinder 10b is rotating, the cylinder openings 16a, 16b, 16c, 17a, 17b, 17c will pass over the stationary supply openings 22a, 22b, 23a, 23b. Due to the axial displacement of the groups 16, 17 of cylinder openings 16a, 16b, 16c, 17a, 17b, 17c and the axial displacement and radial spread of the stationary supply openings 16a, 16b, 17a, 17b, the respective pressure chamber 7a, 7b will always be in contact with its respective supply line 11a, 11b, 12a, 12b.

On each side of the pairs 22, 23 of supply openings 22a, 22b, 23a, 23b are sealing rings 60, 61, 62 provided, such that the sealing rings 60, 61, 62 seals between the supply tube 8 and the shaft cylinder 10b, whereby two annular spaces 63, 64 are formed between the supply tube 8 and the shaft cylinder 10b. The groups 22, 23 of supply openings 22a, 22b, 23a, 23b mouth in one annular space 63, 64 each, whereby independently of the position of the shaft cylinder 10b in relation to the supply tube 8, the cylinder openings 16a, 16b, 16c, 17a, 1b, 17c will have an efficient connection to their corresponding supply line 11a, 11b, 12a, 12b, through the respective annular space 63, 64. Due to sealing rings 60, 61, 62 and the thereby annular spaces 63, 63 loses are in the gerotor pump 1 are reduced.

The cylinder openings 16a, 16b, 16c, 17a, 17b, 17c on the shaft cylinder 10b are located in open compartments 45. The purposes of the compartments 45 are to strengthen the structure of the hollow shaft cylinder 10b. A group of compartments 45 between the two vanes 50, 51 are exposed to the same pressure sections 7a, 7b.

In FIG. 3d the supply tube 8 alone is disclosed. The outer end 21 of the supply tube 8 is provided with the feeding openings 31a, 31b, 32a, 32b (only 32a, 31b is shown in the view of FIG. 3d), which connects the supply lines 11 a, 11 b, 12a, 12b with the supply sockets 18a, 18b, 19a, 19b. Next to the feeding openings 31a, 31b, 32a, 32b, a gear wheel 35 is arranged, over which the supply tube 8 can be turned, by for example an electric motor 37, whereby the feeding openings 31a, 31b, 32a, 32b, can be connected to either the first or second supply socket 18a, 18b, 19a, 19b, this will be further explained in conjunction with FIG. 7.

Figure 4:
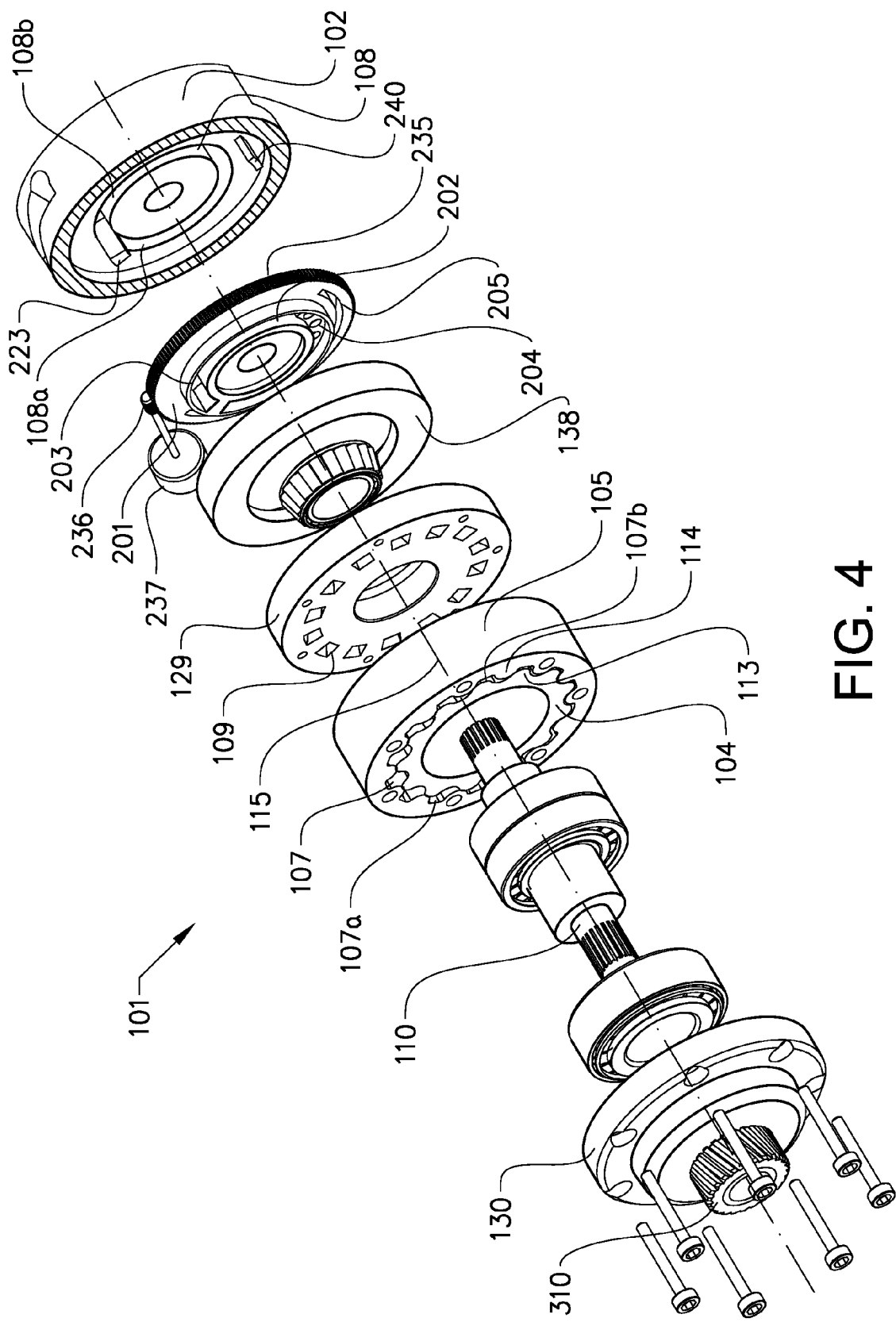
FIG. 4 shows a schematically exploded view drawing of a gerotor motor according to the invention.

In FIG. 4 an embodiment of a gerotor motor 101 according to the invention is disclosed. The gerotor motor 101 is referred to as a motor but can also be used as a pump. The gerotor motor 101 comprises a housing 102, in which a first and a second supply socket are provided. The housing 102 is just partially illustrated in the drawing. An inner rotor 104 and an outer rotor 105 are rotatably arranged, wherein the inner rotor 104 is located within the outer rotor 105, and lobes 113, 114 of the inner rotor 104 and the outer rotor 105 engaging. The inner rotor 104 is centred about a rotational axis 115b which is eccentric from a central axis 115 of a fix central shaft 110 of the gerotor motor 101. The central shaft 110 is stationary relative the housing 102. The inner rotor 104 is eccentric and rotatably arranged on said central shaft 115.

The outer rotor 105 is provided with a first and a second flange 129, 130, which extends radial from both sides of the outer rotor 105, such that the first and second flange 129, 130 defines a pressure chamber 107 with a first and a second pressure section 107a, 107b between the inner and outer rotor 104, 105. The location of the first and the second pressure section 107a, 107b is dependent of where the lobes 13 of the inner rotor 104 engages with the lobes 14 of the outer rotor 105, wherein the pressure sections 107a, 107b will be stationary relative the housing 102, because of the eccentric arrangement of the inner rotor 104 on the central shaft 110.

At least said first flange 129 is provided with axial supply conduits 109, which extends between said pressure chamber 107 and a circular arc shaped supply chamber 108 provided in said housing 102. The axial supply conduits are axial in the sense that they extend from one axial side of the first flange 129 to another axial side, they does not necessary be parallel with the central axis 115.

Said circular arc shaped supply chamber 108 is divided into a first and a second supply chamber 108a, 108b in which one of said supply sockets 118, 119 mouth correspondently, and are separated by a first head 222 (not shown in FIG. 4), which is protruding into said circular arc shaped supply chamber 108.

The placement of the head 222 (shown in FIG. 5) in the circular arc shaped supply chamber 108 is dependent of the desired displacement of the gerotor motor 101. By placing the first head 222 in the middle of the supply chamber 108, such that the first and the second supply chamber 108a, 108b comprises half of the circular arc shaped supply chamber 108 each, the first supply chamber 108a will be connected to the first pressure section 107a and the second supply chamber 108b will be connected to the second pressure section 107b exclusively via the axial supply conduits 109 in the first flange 129.

Since the inner rotor 104 is eccentric and rotatably arranged on the fix central shaft 115, the first and the second pressure section 107a, 107b of the pressure chamber 107 will be stationary relative the housing 102. Hence, the two ends of the circular arc shaped supply chamber 108 are located such that they are placed on each side of the transition from the first and section pressure section 107a, 107b. The circular arc shaped supply chamber 108, obviously has two ends, these should be arranged in the housing 102, such that they are positioned on each side of the transition from the first to the second pressure section 107a, 107b.

The first and second supply socket mouth in a first and a second orifice 131, 132 respectively (shown in FIG. 6), wherein the first orifice 131 is located in said first supply chamber 108a at the end of the circular arc shaped supply chamber 108, and the second orifice 132 is located in said second supply chamber 108b. The circular arc shaped supply chamber 108 is provided with an open cross section area facing said first flange 129, such that an open interface between said supply chamber 108 and the axial supply conduits 109 is formed, wherein the first and second supply chambers 108a, 108b can be exposed to said first and second pressure sections 107a, 107b of the pressure chamber 107 respectively, via the axial supply conduits 109, when the first head 222 is arranged in the middle between the two ends, i.e. right in front of where the lobes 113 of the inner rotor 104 engages with the lobes 114 of the outer rotor 105. The first head 222 is further described below and shown in FIG. 5b.

In the embodiment of the gerotor motor 101 shown in FIG. 4, the gerotor motor 101 is provided with a rotatably arranged control disc 201. The control disc is provided between said housing 102 and said first flange 129. The control disc 201 is provided with an interface section 202 having at least a first and a second opening 203, 204, which levels with the interface between the supply chamber 108 and the axial supply conduits 109. In this preferred embodiment the first head 222 is arranged on the control disc 201, whereby a control of the displacement of the gerotor motor 101 enabled through a turning of the control disc 201. By turning the control disc 201, the first head 222 slides in the supply chamber 108a, wherein the size of the first and second supply chamber 108a, 108b can be varied.

Preferably is thereby a second head 223 arranged in the housing 102 between the ends of the circular arc shaped supply chamber 108, which second head 223 protrude into the first opening 203 of the control disc 201. The control disc 201 is placed between the housing 102 and the first flange 109 such that the first head 222 can slide in the first supply chamber 108a and the second head 223 can slide in said first opening 203 of the interface section 202 in the control disc 201, when the control disc 201 is turned. The control disc 201 is provided with gearings 235 at its outer periphery, wherein the control disc can be turned for example over an electric motor 237, via the worm gear 236.

The control disc 201 will now be described in further detail in conjunction with FIGS. 5a and 5b. The interface section 202 comprises the first opening 203 and the second opening 204. The first opening 203 is circular arc shaped and adapted such that the second head 223 can slide therein. The first opening 203 is a half circular arc. The circular shape of the first opening 203 and the supply chamber 108 allows a turning of the control disc 201, wherein the first and second heads 222, 223 are guided in the supply chamber 108 and the first opening 203 respectively. The second opening 204 actually comprises of several circle shaped bore holes. Theoretically, could also be the second opening 204 be a fully open circular arc shaped opening, like the first opening 203, however, a design with several small holes, like the ones shown, increases the strength of the control disc 201.

To achieve a moment equilibrium, for the control disc 201, about the central axis 215, the control disc 201 is provided with a second interface section 205, which also is a circular arc shaped opening and which is placed essentially opposite the first opening 203 and which is located radially outside (as shown in the figures) or radially inside of the first interface section 201. The second interface section 205 is adapted to be connected to the one of the supply chambers 108a, 108b that is exposed to the high pressure, and thereby provide a moment equilibrium about a centre axis 215 of the control disc 201, when the openings 203, 204 (FIGS. 4 and 6) in the control disc 201 is. To achieve this a third head 240 is arranged in the housing 102, said third head 240 is adapted to slide in the second interface section 205, when the control disc 201 is turned. The second interface section 205 is exposed to the pressure from the respective supply chamber 108a, 108b on the opposite side of the third head 240 as the respective supply chamber 108a, 108b is located, whereby a moment equilibrium is achieved. Due to the moment equilibrium, the control disc 201 can be easily turned.

Now, the function of the control disc 201 will be explained in conjunction with FIG. 6a-d and the FIGS. 4 and 5. First, the use of the control disc 201 to control the displacement of the gerorot motor 101 is dependent of that an adequate circular arc shaped supply chamber 108 is arranged in the housing 102 of the gerorot motor 101. The gerotor motor 101 in the shown embodiment is configured, such that the first orifice 131 is connected to a high pressure supply socket and the second orifice is to a low pressure supply socket. The gerorot motor 101 will therefore also be explained as if this is the case. The gerorot motor 101 can however be driven in the opposite direction, wherein the efficiency will be lower.

Figure 6A:
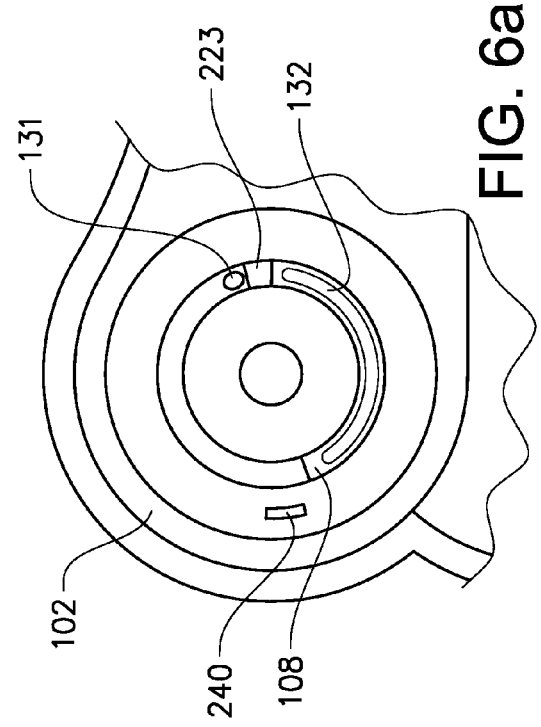
FIG. 6 a shows a schematically drawing of the circular arc shaped supply chamber in the housing of the gerotor motor.
FIGS. 6b-d shows a schematically drawing of three positions of the control disc.

In FIG. 6a is a schematically drawing of the housing 102 shown, in which the circular arc shaped supply chamber 108 is arranged. The circular arc shaped supply chamber 108 extends in almost a full circle, wherein the two ends of the circular arc shaped supply chamber 108 are separated by a head 223. At each end of the supply chamber 108 is the orifice 131, 132 arranged, in which the supply sockets of the gerotor motor 101 mouth. The first orifice 131 have as size, such that it can be covered of the head 222 arranged on the control disc 201. In a normal operation of the gerorot motor 1, the first orifice 131 is adapted to be the high pressure inlet. The second orifice 132 extends further into the supply chamber 108, wherein the second orifice 132 is adapted to be the low pressure outlet. The shape of the second orifice 132 is adapted to optimise the flow out of the circular arc shaped chamber 108. Even though the first and second orifice 131, 132 is adapted to be a high pressure inlet and a low pressure outlet, the gerotor motor 101 can be used vice verse, wherein the gerotor motor 101 becomes a lower efficiency.

The housing 102 and the rotors 104, 105 are positioned relative each other, such that the first and the second pressure section 107a, 107b facing a half of the circular arc shaped supply chamber 108 each.

Figure 6B:
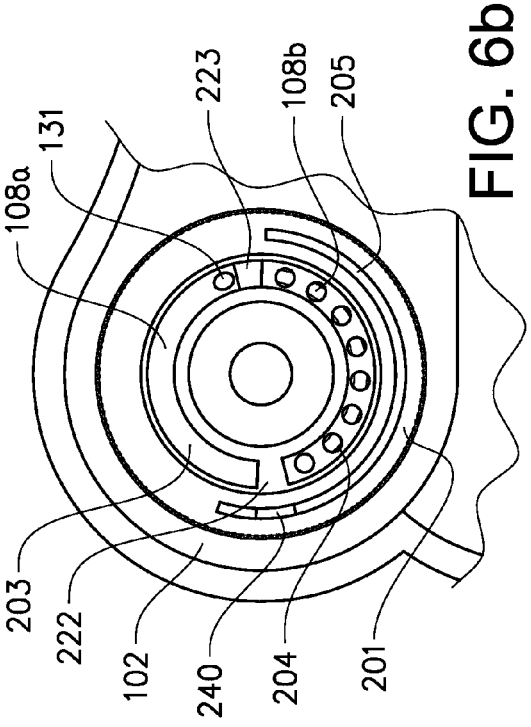
Figure 6C:
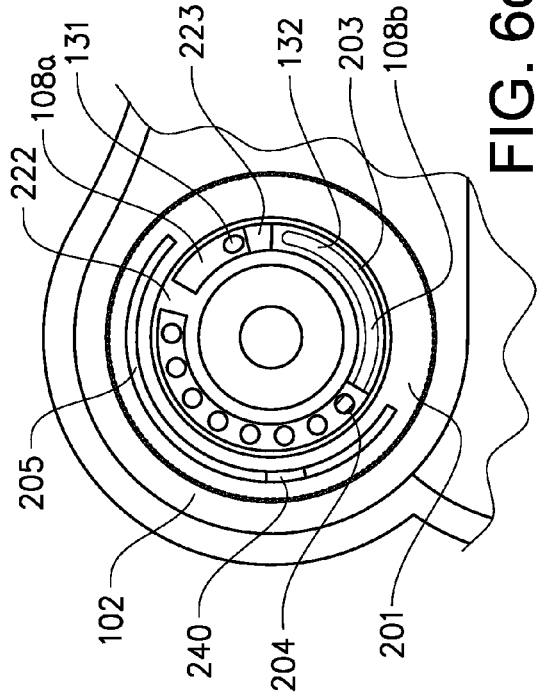
Figure 6D:
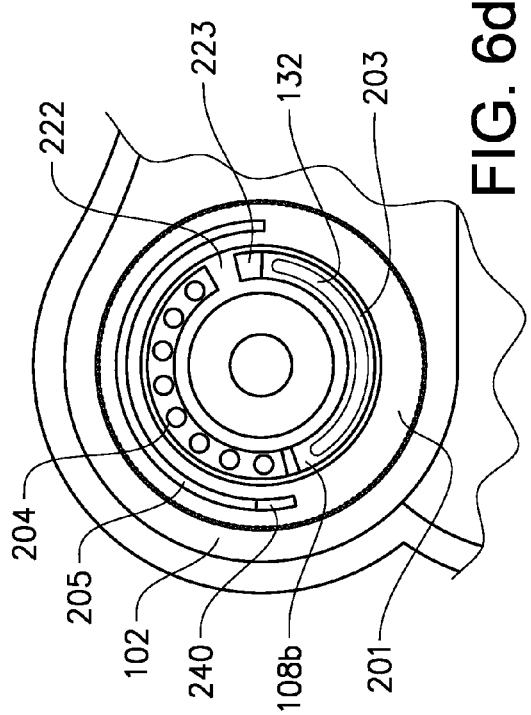

Now, in FIG. 6b, 6c, 6d the control disc 201 is mounted in the housing 102 in front of the circular arc shaped supply chamber 108. In the FIGS. 6b, 6c, 6d the first head 222 cannot be seen, because it is arranged on the side of the control disc 102 not shown, however, because the first head 222 is important for the control function, the position of the first head 222 is marked with the reference number of the control disc, i.e. 22, in these figures.

In FIG. 6b the control disc 201 is positioned in a starting position, in which the control disc 201 is arranged such that the first head 222 is positioned opposite the second head 223. Thereby the first and the second supply chamber 108a, 108b comprises half of the supply chamber 108 each. The first supply chamber 108a extends between the first head 222 the second head 223 such that the first orifice 131 mouth therein, and the second supply chamber 108b extends between the first head 222 and the second head 223 such that the second orifice 132 mouth therein. The first and the second supply chamber 108a, 108 are thereby exclusively exposed to the first and second pressure section 107a, 107b of the pressure chamber 107, via the axial supply conduits 109 in the first flange 129. In this starting position the displacement of the pressure medium in the gerotor motor 101 is 100%.

In FIG. 6c is the end position of the control disc 201 shown. In the end position the control disc 201 has been turned relative the housing 102, such that the first head 222 covers the first orifice 131, and thereby is placed next to the second head 223. In the end position the second supply chamber 108b comprises the all of the supply chamber 108, which is not occupied by the first head 222, and thereby is the second supply chamber 108b, connected to both the first and the second pressure section 107a, 107b of the pressure chamber 107. In this end position the displacement of the gerotor motor 101 is zero at the gerotor motor 101 is not able to transmit any torque, hence the gerotor motor 101 freewheels, since it cannot build up any pressure between the two pressure sections 107a, 107b, and the pressure chamber 107 is only connected to one of the supply sockets.

The control disc 201 is preferably infinitely displaceable in a plurality of positions in between the start and end position; however a discrete displacement is just as possible. One such position is shown in FIG. 6c, in which the gerotor motor 101 is set for a partially displacement, i.e. between 100 and 0%. Wherein in partial displacement, the first head 222 is placed such that the first supply chamber 108a is smaller than the second supply chamber 108b, whereby the second supply chamber 108b is exposed to both the first and the second pressure section 107a, 107b. Hence, the pressure in the first pressure section 107a can be build up just in the part of the section 107a that is facing the reduced first supply chamber 108a, thereby is the displacement of the gerorot motor 101 changed, wherein the closer the first head 222 is to the second head 223, the lower is the displacement. The control disc 102 thereby allow a recirculation with a low pressure with the same stroke length, thereby is a high efficiency achieved also during partial displacement. However, the gerorot motor 1 can be driven in the opposite direction, wherein high losses occur during the change of stroke length.

How far the control disc 201 can be turned are limited by the first and the second head 222, 223 and the first opening 203 in the control disc 201, in which the second head slides, when the control disc 201 is turned.

The gerotor motor 101 can be design without the control disc 201, wherein the flange 109 is placed directly next to the housing 102 with the supply chamber 108. In such a design the displacement of the gerotor motor 101 is constant, dependent of where in the supply chamber the first head 222 is arranged.

However, in the shown preferred embodiments of the gerotor motor 101, it is provided with a control disc 201, the second head 223 is provided as a part of the housing 102 between and essentially next to at least said first orifices 131, and wherein said first head 222 is arranged on the control disc 201 and adapted to slide in said circle shaped supply chamber 108 as the control disc 201 is turned. The second head 123 is adapted to be to fit into said first opening 203, whereby the control disc 201 can be turned such that the first head 222 is guided in the circular arc shaped supply chamber 108 and the control disc 201 is further guided by second head 123 arranged in said first opening 203.

The control disc 201 is provided with a gearing 235 on its outer circumference. The control disc 201 can thereby be displaced by an electric motor 237, for example over a worm gear 236.

The control disc 201 is described above in relation the gerotor motor 101. The inventive control disc 201 can however also be used for controlling other displacement pumps and motors, such as a bent axis displacement pump provided with a housing, which is adapted to fit with the control disc 201.

FIG. 7 illustrates how the flow direction of the pressure medium can be changed by the turnable supply tube 8 in the gerotor pump 1 (FIGS. 1-3) according to the invention. The outer end 21 of the supply tube 8 is provided with a first and a second feeding opening 31a, 31b; 32a, 32b, which corresponds to the first and second supply line 11a, 11b; 12a, 12b. The supply tube 8 can be turned such that said feeding openings can be positioned in; a first position FIG. 7a, a second position FIG. 7c, and a third position FIG. 7b.

As described earlier, the feeding lines 11, 12 of the respective the feeding openings 31a, 31b, 32a, 32b of are connected to the high and low pressure section 7a, 7b respectively. This enables to change to pumping direction of the pressure medium relative the supply sockets 18a, 18b, 19a, 19b by turning the supply tube 8. This will described below.

In the first position, shown in FIG. 7a, the first feeding opening 31a, 31b is connected to the first supply socket 18a, 18b and the second feeding opening 32a, 32b is connected to the second supply socket 19a, 19b. Thereby, in this first position, a pressure medium can be pumped from the second supply socket 19a, 19b to the first supply socket 18a, 18b.

In the second position, shown in FIG. 7c, the first feeding opening 31a, 31b is connected to the second supply socket 19a, 19b and the second feeding opening 32a, 32b is connected to the first supply socket 18a, 18b. Thereby, in this first position, a pressure medium can be pumped from the first supply socket 18a, 18b to the second supply socket 19a, 19b.

In the third position, shown in FIG. 7b, the first and the second feeding opening 31a, 31b; 32a, 32b are directly connected with each outer, wherein no pressure can be build up between the high pressure section 7a and the low pressure section 7b of the pressure chamber 7, since these are directly connected with each other. Hence no displacement will take place.

When the gerotor pump 1 is used in a transmission system 301, which is described further below, this can be used to create a forward, backward and neutral gear for the transmission.

Figure 8A:
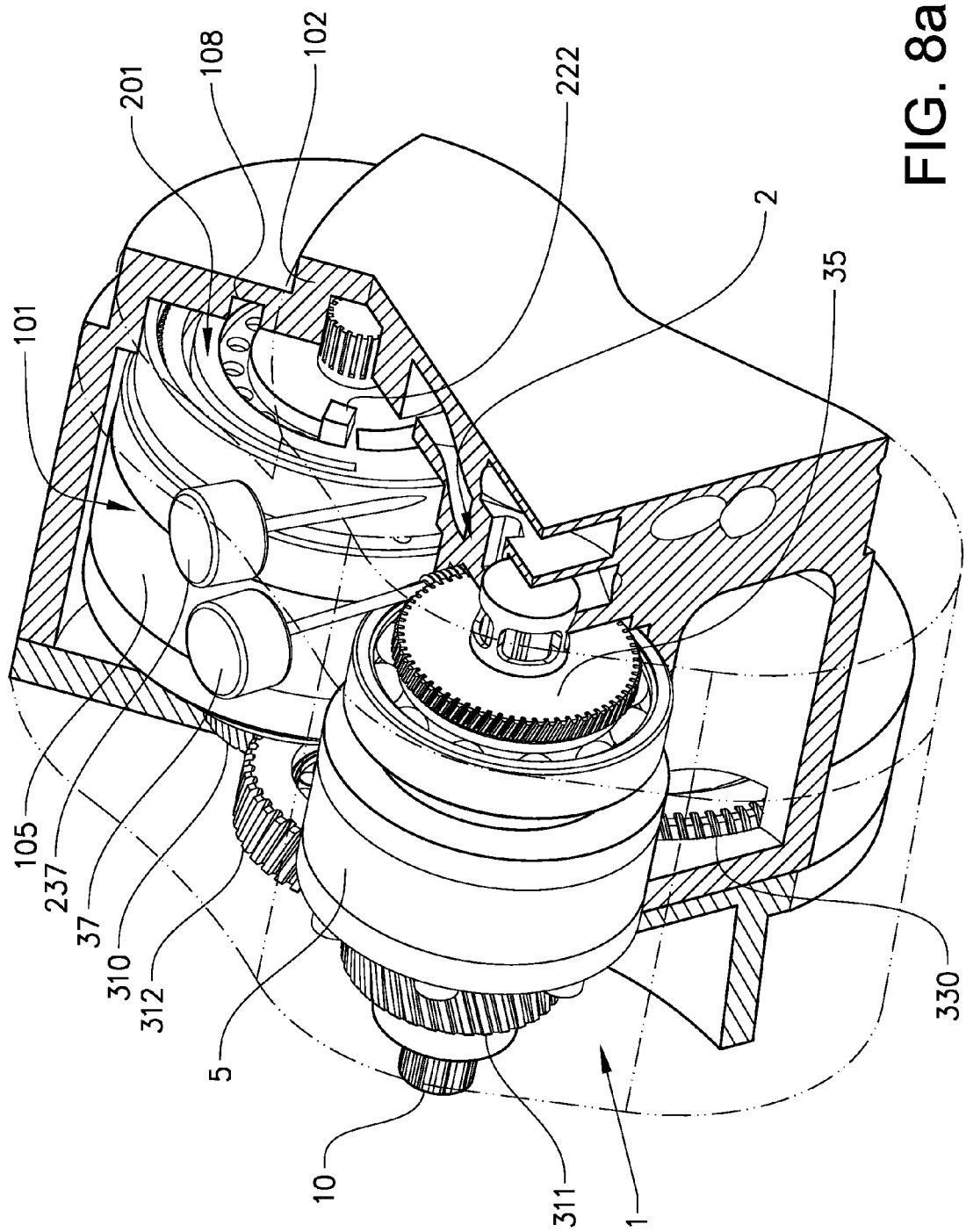
FIGS. 8a, b each show a schematically drawing of the hydraulic transmission.
Figure 8B:
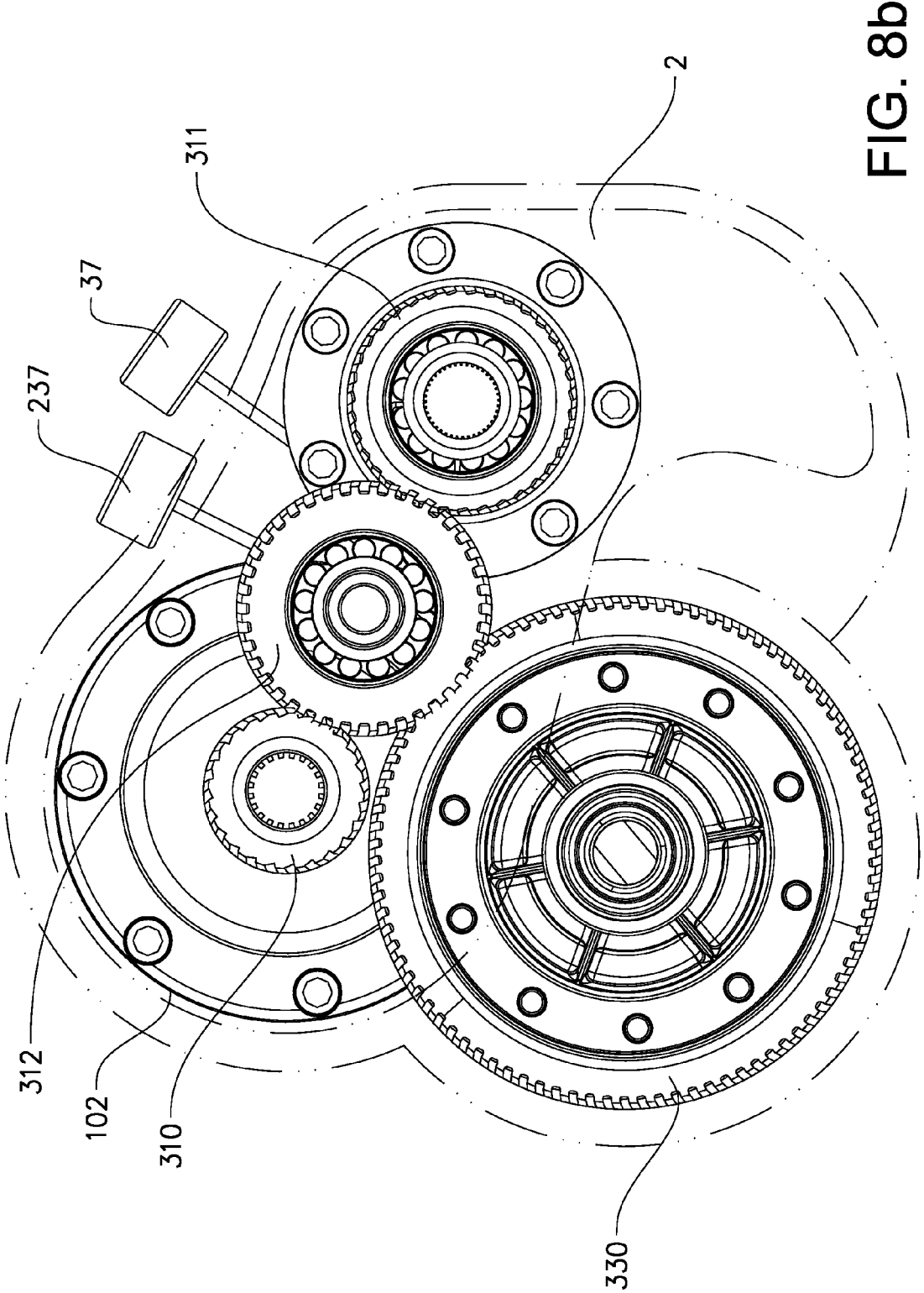

The inventive gerotor pump 1 and the gerotor motor 101 can be combined in an inventive hydraulic transmission system 301 as shown in FIG. 8a, 8b. To achieve this, the outer rotors 5, 105 of the gerotor pump 1 and the gerotor motor 101 are provided with gearings 310, 311, and said gearings 310, 311 meshes with each other, directly or indirectly over additional gearing 312, and wherein the feeding openings 31a, 31b; 32a, 32b of said geroter pump 1 are connected to the supply sockets 131, 132 of said gerotor motor 101, such that said gerotor pump 1 drives said gerotor motor 101, and a closed oil circulation system is formed. The input of the transmission system 301 would be the central shaft 10 of the gerotor pump 1. The input could be connected to a flywheel of a combustion engine. The output of the transmission system 301 would be the gearing 310, 311 of the gerotor motor 101 and the gerotor pump 1 respectively, which meshes with each other, for example over an additional gearing 312.

In a preferred embodiment of the hydraulic transmission system 301 a gas filled accumulator 320 is provided in the pressure medium circulation system, wherein said accumulator 320 is compressible, such that it is adapted to absorb pressure spikes in the pressure medium circulation system. Due to the absorption of pressure spikes in the pressure medium circulation system, a flywheel of a combustion engine connected to the input of the hydraulic transmission system 301 can be made smaller, whereby costs and weight of the vehicle are saved.

A hydraulic transmission system 301 according to the invention, in which the gerotor pump is provided with a turnable supply tube 8 allowing the pressure medium to be pumped from either the first supply socket 18a, 18b to the second supply socket 19a, 19b or in opposite direction, and a gerotor motor 101 provided with a control disc allowing to adjust the displacement of the gerotor motor 101 between 100 and 0%, is usable as a fully functional transmission for a vehicle, with a full range gear ratios for both forward and backwards driving. This is achieved, due to that the direction of flow from the gerotor pump 1 can be adjusted with the turnable supply tube 8, as describe in conjunction with FIG. 7. And the different gear ratios are achieved through the change of displacement in the gerotor motor 101, with the control disc 201.

As will be realised, the invention is capable of modification in various obvious respects, all without departing from the scope of the appended claims. Accordingly, the drawings and the description thereto are to be regarded as illustrative in nature, and not restrictive.

Reference signs mentioned in the claims should not be seen as limiting the extent of the matter protected by the claims, and their sole function is to make claims easier to understand.

The invention claimed is:

1. A gerotor pump comprising:
a housing which comprises a first supply socket and a second supply socket,
an inner rotor; and
an outer rotor rotatably located relative the housing;
wherein the inner rotor is located within the outer rotor, lobes of the inner and the outer rotors are engaged, and the inner rotor is centered around a rotational axis which is eccentric from an axis of rotation of said outer rotor,
wherein a pressure chamber with a high pressure and a low pressure section is defined between the inner and outer rotors,
wherein the inner rotor is rotatably arranged on a shaft cylinder which is fixed at one end of a central drive shaft of the pump and is centered about said rotational axis, whereby said inner rotor wanders in said outer rotor when said central drive shaft is turned,
wherein the inner rotor is provided with radial supply conduits extending from the pressure chambers to the shaft cylinder,
wherein said shaft cylinder is provided with at least a first and a second cylinder opening, such that the first cylinder opening is axially displaced relative the second cylinder opening, and said first opening is arranged such that it is connected to said high pressure section, and said second cylinder opening is arranged such that it is connected to said low pressure section,
wherein an inner end of a supply tube is provided inside the shaft cylinder, said supply tube is provided with a first and a second supply line, which in its outer end are connected to a first and second supply socket correspondently, and the supply tube is provided with at least a first and a second supply opening corresponding to said first and second supply line, and wherein the first and second supply openings are axially displaced relative each other such that the axial positions of said first and second supply openings correspond to the axial position of said first and second cylinder openings,
wherein said first and second supply lines are divided into two sub supply lines each located opposite each other in the supply tube, and wherein each sub supply line is provided with a corresponding supply opening located at the same axial position, and
wherein a first, second and third sealing ring are provided between said supply tube and said shaft cylinder, such that two spaces, sealed from each other, are formed between the supply tube and the shaft cylinder.

2. A gerotor pump according to claim 1, wherein a first and a second flange are provided at each side of the outer rotor, wherein said first and second flanges rotate with the outer rotor and limit the pressure chamber in the axial direction.

3. A gerotor pump according to claim 1, wherein the outer end of said supply tube is provided with a first and a second feeding opening corresponding to said first and second supply line, wherein said supply tube is rotatably displaceable between:
a first position, in which the first feeding opening is connected to the first supply socket and the second feeding opening is connected to the second supply socket,
a second position, in which the first feeding opening is connected to the second supply socket and the second feeding opening is connected to the first supply socket, and
a third position, in which the first and the second feeding opening are directly connected with each other.

* * * * *